United States Patent Office.

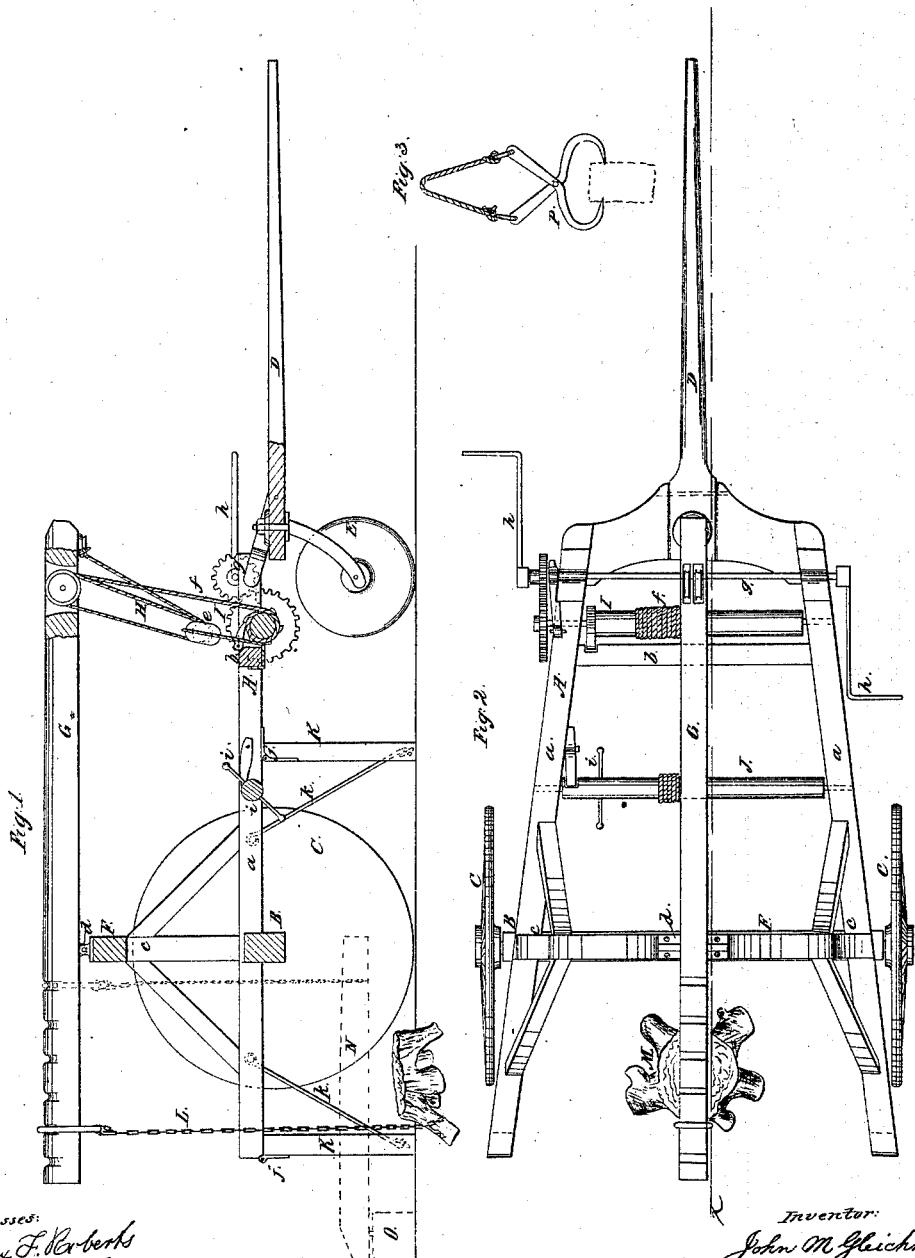

JOHN M. GLEICHMAN, OF EVANSVILLE, INDIANA.

*Letters Patent No. 62,192, dated February 19, 1867.*

IMPROVEMENT IN STUMP EXTRACTOR.

The Schedule referred to in these Letters Patent and making part of the same.

TO ALL WHOM IT MAY CONCERN:

Be it known that I, JOHN M. GLEICHMAN, of Evansville, Vanderburg county, State of Indiana, have invented a new and improved Machine for Extracting Stumps, Raising Stones, etc.; and I do hereby declare that the following is a full, clear, and exact description thereof, which will enable others skilled in the art to make and use the same, reference being had to the accompanying drawing, forming part of this specification, in which—

Figure 1 is a side sectional view of my invention, taken in the line $x$ $x$, fig. 2.

Figure 2, a plan or top view of the same.

Figure 3, a detached view of a grapple or hook pertaining to the same.

Similar letters of reference indicate like parts.

This invention relates to a new and improved machine for extracting stumps, raising heavy stones, logs, etc., and conveying or transporting the same to any desired place. The invention consists in the employment of one or more levers arranged in connection with a tackle and windlass, and a frame mounted on wheels, as hereinafter fully shown and described, whereby stumps may be extracted with the greatest facility, heavy stones and logs raised and transported or conveyed from place to place with but a very moderate expenditure of time and labor.

A represents a horizontal frame composed of two side-pieces, $a$ $a$, having an oblique position relatively with each other, and secured to an axle, B, on which wheels C C are placed loosely. The side-pieces $a$ $a$ near their front ends are connected by a cross-piece, $b$, and between the front ends of the side-pieces $a$ $a$ a draught-pole, D, is secured, the rear part of which has a caster-wheel, E, attached, said wheel supporting the front part of frame A, while the wheels C C support the rear part, as will be fully understood by referring to fig. 1. F is a horizontal bar which rests upon supports, $c$, attached to the side-pieces $a$ $a$, and is directly over the axle B, and G is a lever, the fulcrum $d$ of which is on the bar F. This lever G has a longitudinal position relatively with the frame A, and to its front end a tackle, H, is attached, the block $e$ of which is secured to the cross-piece $b$ of the frame A. The rope $f$ of the tackle is attached to a windlass, I, in the front part of frame A, the driving-shaft $g$ of which may be provided with a crank, $h$, at each end. J is a windlass placed in the centre of frame A. This windlass may be composed of a drum, having a lever, $i$, applied directly to it. The frame A is provided with props or standards, K, two at each side, and connected to the frame by hinges or joints, $j$, so that they may be folded up out of the way when not required for use, the props or standards being retained in position, when in use, by brace rods, $k$, shown clearly in fig. 1.

The device is used as follows: In extracting stumps, the machine is backed close to the stump and the props or supports K let down and secured in position by the brace rods $k$. A chain, L, which is fitted on the rear and shorter arm of the lever G, has its lower end attached to the stump designated by M, and the windlass I turned so as to bring down the front and longer arm of lever G, which causes the rear and shorter arm of the same to rise, and with it the stump M. It will be seen from the above description, that a power is obtained from the windlass, tackle and lever, and hence the device is rendered very efficient. In cases where necessary a supplemental lever, N, may be employed, as shown in red in fig. 1, the chain L being used to connect the two levers G N, and the latter connected to the stump by a short chain, the fulcrum of lever N being on a block, O. In order to raise and transport logs, one end of the log is raised in the same way as a stump is extracted, with the exception that a hook, P, (see fig. 3,) may be used for grasping the log. One end of the log is elevated above the axle B, and a chain or rope of windlass J attached to the elevated end of the log, and the latter, by turning windlass J, drawn up on the axle.

Having thus described my invention, I claim as new, and desire to secure by Letters Patent—

The lever G, tackle H, and windlass I, arranged, combined, and applied to a mounted frame A, to operate in the manner substantially as and for the purpose set forth.

I also claim the supplemental lever N, in combination with the lever G, tackle H, and windlass I, substantially as and for the purpose specified.

I further claim the windlass J, in combination with the lever G, tackle H, and windlass I, substantially as and for the purpose set forth.

JOHN M. GLEICHMAN.

Witnesses:
 BEN. STINSEN,
 C. CAPELLE,
 JAS. MORRIS.